(12) United States Patent
Davis et al.

(10) Patent No.: US 11,025,658 B2
(45) Date of Patent: Jun. 1, 2021

(54) GENERATING SUMMARIES OF MESSAGES ASSOCIATED WITH ASSETS IN AN ENTERPRISE SYSTEM

(71) Applicant: EMC IP Holding Company LLC, Hopkinton, MA (US)

(72) Inventors: Sashka T. Davis, Vienna, VA (US); Kevin J. Arunski, Sterling, VA (US); Zulfikar A. Ramzan, Saratoga, CA (US); Scott Moore, Fredericksburg, VA (US); Abram Q. Thielke, Leesburg, VA (US); Ed G. Quackenbush, Oakton, VA (US); Matthew D. Tharp, Denver, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 277 days.

(21) Appl. No.: 16/402,313

(22) Filed: May 3, 2019

(65) Prior Publication Data

US 2020/0351284 A1   Nov. 5, 2020

(51) Int. Cl.
*G06F 12/14* (2006.01)
*H04L 29/06* (2006.01)
(Continued)

(52) U.S. Cl.
CPC ........ *H04L 63/1425* (2013.01); *G06F 40/284* (2020.01); *G06F 40/295* (2020.01);
(Continued)

(58) Field of Classification Search
CPC ............. H04L 63/1425; H04L 63/1441; H04L 63/1416; G06F 17/277; G06F 17/2785;
(Continued)

(56) References Cited

U.S. PATENT DOCUMENTS

| 8,789,166 B2 * | 7/2014 | Lu ........................ H04L 9/3226 726/18 |
| 10,929,763 B2 * | 2/2021 | Xu .......................... G06F 40/00 |

(Continued)

FOREIGN PATENT DOCUMENTS

WO   2017131774 A1   8/2017

OTHER PUBLICATIONS

Davis, Sashka T. et al., "OCCAMS—An Optimal Combinatorial Covering Algorithm for Multi-document Summarization," 2012 IEEE 12th International Conference on Data Mining Workshops, Dec. 10, 2012, Brussels, Belgium, 17 pages.

*Primary Examiner* — Amare F Tabor
(74) *Attorney, Agent, or Firm* — Ryan, Mason & Lewis, LLP

(57) ABSTRACT

A method includes obtaining messages associated with assets in an enterprise system, splitting each of the messages into a set of tokens, determining a count of a number of occurrences of each of the tokens, and assigning weights to the tokens based at least in part on the counts of the number of occurrences of the tokens. The method also includes determining a score for each of the messages based at least in part on a combined sum of the weights for the set of tokens of that message, generating a summary of the messages by selecting a subset of the messages for based at least in part on the scores. The method further includes identifying remedial actions to be applied to assets in the enterprise system based at least in part on the summary of the messages, and implementing at least one of the identified remedial actions.

20 Claims, 6 Drawing Sheets

(51) Int. Cl.
*G06F 40/30* (2020.01)
*G06F 40/284* (2020.01)
*G06F 40/295* (2020.01)

(52) U.S. Cl.
CPC .......... *G06F 40/30* (2020.01); *H04L 63/1416* (2013.01); *H04L 63/1441* (2013.01)

(58) Field of Classification Search
CPC .... G06F 17/278; G06F 40/284; G06F 40/295; G06F 40/30
USPC .......................................................... 726/23
See application file for complete search history.

(56) References Cited

U.S. PATENT DOCUMENTS

| | | |
|---|---|---|
| 2005/0114321 A1 | 5/2005 | DeStefano et al. |
| 2009/0113246 A1 | 4/2009 | Sabato et al. |
| 2013/0268839 A1 | 10/2013 | Lefebvre et al. |
| 2019/0043486 A1* | 2/2019 | Salloum .................. G10L 15/16 |
| 2020/0226214 A1* | 7/2020 | Reddekopp ............ G06N 20/00 |
| 2020/0327381 A1* | 10/2020 | Tan ....................... G06F 16/383 |

\* cited by examiner

GENERATING SUMMARIES OF MESSAGES ASSOCIATED WITH ASSETS IN AN ENTERPRISE SYSTEM

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats include, for example, vulnerabilities in devices in an enterprise network, which present risks that can expose the enterprise and its users or devices. As enterprise networks continue to grow in scale, the task of monitoring for security threats through analyzing large collections of log messages from devices in the enterprise network presents various challenges.

SUMMARY

Illustrative embodiments of the present invention provide techniques for generating summaries of messages associated with assets in an enterprise system. Embodiments advantageously utilize the generated summaries to identify remedial actions to apply to assets in the enterprise system to improve operation of the enterprise system.

In one embodiment, a method comprises obtaining a plurality of messages associated with one or more assets in an enterprise system, a given one of the assets comprising at least one of a physical computing resource and a virtual computing resource in the enterprise system. The method also comprises splitting each of the plurality of messages into a set of tokens, determining a count of a number of occurrences of each of the tokens in the plurality of messages, and assigning weights to each of the tokens, the weight assigned to a given one of the tokens being based at least in part on the count of the number of occurrences of the given token in the plurality of messages. The method further comprises determining a score for each of the plurality of messages, the score for a given one of the plurality of messages being based at least in part on a combined sum of the weights for the set of tokens of the given message, and generating a summary of the plurality of messages by selecting a subset of the plurality of messages for inclusion in the summary based at least in part on the scores for the plurality of messages. The method further comprises identifying one or more remedial actions to be applied to at least one of the assets in the enterprise system based at least in part on the summary of the plurality of messages, and implementing at least one of the identified remedial actions for the at least one asset in the enterprise system. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 shows an example of a summary generated for a plurality of messages in an illustrative embodiment.

FIG. 4 shows another example of a summary generated for a plurality of messages in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
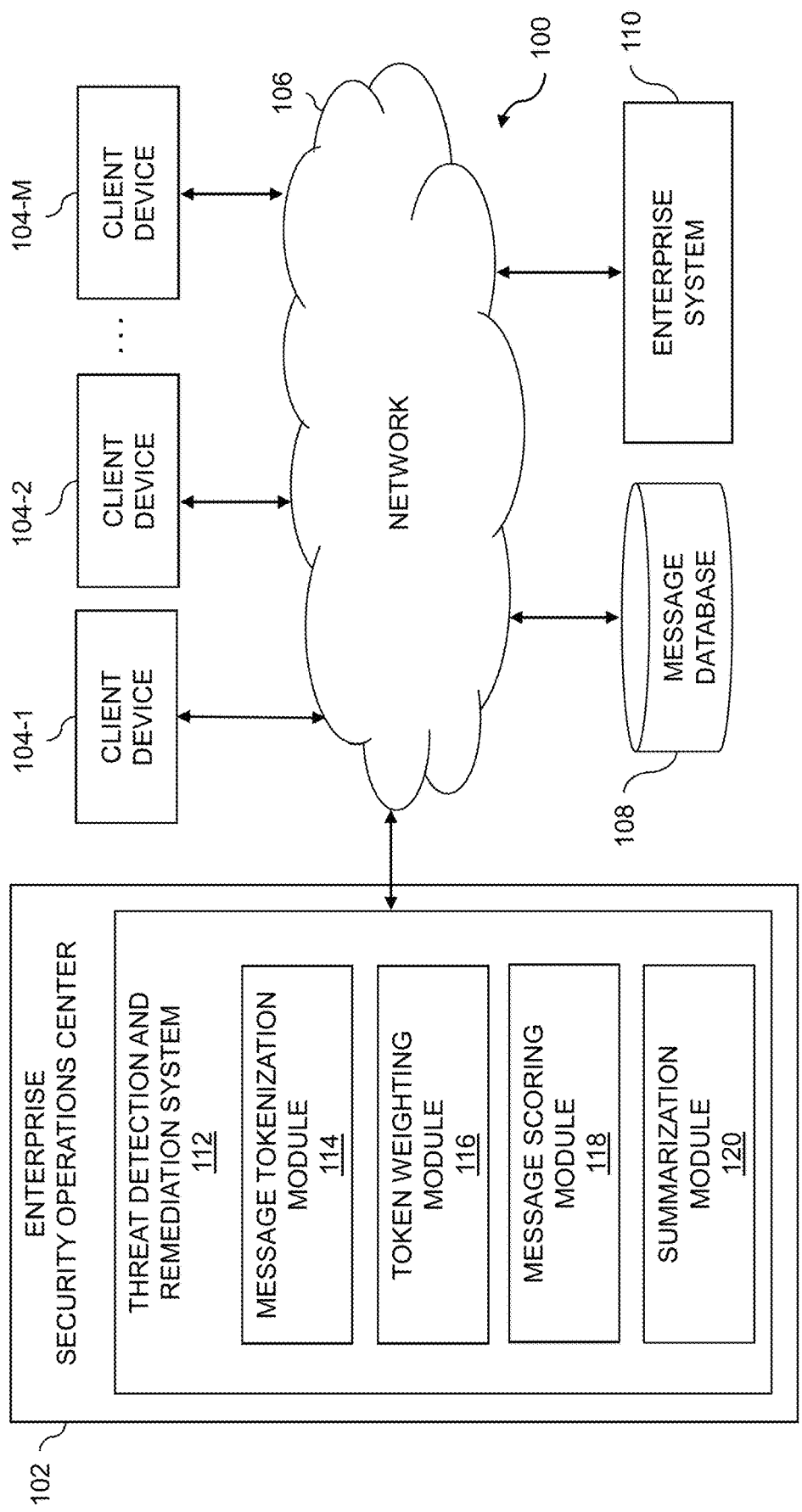
FIG. 1 is a block diagram of an information processing system for generating summaries of messages associated with assets in an enterprise system in an illustrative embodiment of the invention.

FIG. 1 shows an information processing system 100 configured in accordance with an illustrative embodiment. The information processing system 100 is assumed to be built on at least one processing platform and provides functionality for generating summaries of messages that are associated with assets in an enterprise system 110. The assets of the enterprise system 110 may include respective computing resources, such as physical or virtual computing resources (e.g., virtual machines (VMs), containers, etc.). Assets may include computing resources themselves (e.g., physical or virtual hardware appliances or devices), or software applications running on such computing resources. Such assets are assumed to produce or be otherwise associated with messages (e.g., log messages) that are monitored by an enterprise security operations center (SOC) 102. The assets in the enterprise system 110 may be accessed or utilized by a plurality of client devices 104-1, 104-2, . . . 104-M, collectively referred to herein as client devices 104. The client devices 104 are coupled to a network 106. Also coupled to the network 106 is a message database 108, which may store various information relating to messages associated with assets in the enterprise system 110.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The message database 108, as discussed above, is configured to store and record information relating to messages associated with assets in the enterprise system 110. In some embodiments, the messages include log messages generated by the assets in the enterprise system 110, or by client devices 104 or other devices configured for monitoring the assets in the enterprise system 110. The messages may alternatively represent network sessions between assets in the enterprise system 110, or between assets in the enterprise system 110 and respective ones of the client devices 104.

The message database 108 in some embodiments is implemented using one or more storage systems or devices associated with the enterprise SOC 102. In some embodiments, one or more of the storage systems utilized to implement the message database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity, organization or other enterprise.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access by one or more of the client devices 104 to certain assets of the enterprise system 110, requiring user input or authentication by the client devices 104 to obtain information from or otherwise utilize one or more assets of the enterprise system 110, triggering further review of the enterprise system 110 or assets thereof, etc. Remedial measures may also include modifying the configuration of assets in the enterprise system, such as by applying security hardening measures to the assets.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to generate summaries of collections of messages associated with assets in the enterprise system 110, and to utilize such summaries to guide the implementation of remedial actions applied to the assets in the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises message tokenization module 114, token weighting module 116, message scoring module 118, and summarization module 120.

The message tokenization module 114 is configured to obtain a plurality of messages associated with one or more assets in the enterprise system 110. The messages may be obtained directly from the assets themselves (e.g., through application programming interfaces (APIs) or other mechanisms exposed by the assets that generate such messages), through client devices 104 or assets responsible for monitoring the enterprise system 110, from the message database 108, etc. The message tokenization module 114 is also configured to split each of the plurality of messages into a set of tokens, and to determine a count of a number of occurrences of each of the tokens in the plurality of messages.

The token weighting module 116 is configured to assign weights to each of the tokens. The weight assigned to a given token is based at least in part on the count of the number of occurrences of the given token in the plurality of messages (e.g., the weight for the given token is proportional to its count). As will be described in further detail below, the weights may be adjusted upwards or downwards as specified by a user for certain designated special tokens.

The message scoring module 118 is configured to determine a score for each of the plurality of messages. The score for a given one of the plurality of messages is based at least in part on a combined sum of the weights for the set of tokens of the given message.

The summarization module 120 is configured to generate a summary of the plurality of messages by selecting a subset of the plurality of messages for inclusion in the summary based at least in part on the scores for the plurality of messages. The summarization module 120 is also configured to utilize the summary of the plurality of messages to identify one or more remedial actions to be applied to at least one of the assets in the enterprise system 110. The threat detection and remediation system 112 implements at least one of the identified remedial actions for the at least one asset in the enterprise system 110.

It is to be appreciated that the particular arrangement of the enterprise SOC 102, threat detection and remediation system 112, message tokenization module 114, token weighting module 116, message scoring module 118 and summarization module 120 illustrated in the FIG. 1 embodiment is presented by way of example only, and alternative arrangements can be used in other embodiments. As discussed above, for example, the enterprise SOC 102, threat detection and remediation system 112, message tokenization module 114, token weighting module 116, message scoring module 118 and summarization module 120 may in some embodiments be implemented internal to one or more of the client devices 104. As another example, the functionality associated with the message tokenization module 114, token weighting module 116, message scoring module 118 and summarization module 120 may be combined into one module, or separated across more than four modules with the multiple modules possibly being implemented with multiple distinct processors or processing devices.

At least portions of the message tokenization module 114, token weighting module 116, message scoring module 118 and summarization module 120 may be implemented at least in part in the form of software that is stored in memory and executed by a processor.

It is to be understood that the particular set of elements shown in FIG. 1 for generating summaries of messages associated with assets in the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The client devices 104 and threat detection and remediation system 112 or components thereof (e.g., message tokenization module 114, token weighting module 116, message scoring module 118 and summarization module 120) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for generating summaries of messages associated with assets in an enterprise system will now be described in more detail with reference to the flow diagram of FIG. 2. It is to be understood that this particular process is only an example, and that additional or alternative processes for generating summaries of messages associated with assets in an enterprise system can be carried out in other embodiments.

In this embodiment, the process includes steps 200 through 214. These steps are assumed to be performed by the threat detection and remediation system 112 utilizing the message tokenization module 114, token weighting module 116, message scoring module 118 and summarization module 120. The process begins with step 200, obtaining a plurality of messages associated with one or more assets in an enterprise system. The assets may comprise physical or virtual computing resources in the enterprise system, including software applications running on such physical or virtual computing resources. The plurality of messages may comprise log messages obtained from the one or more assets in the enterprise system, representations of network sessions between pairs of assets in the enterprise system, etc.

Figure 2:
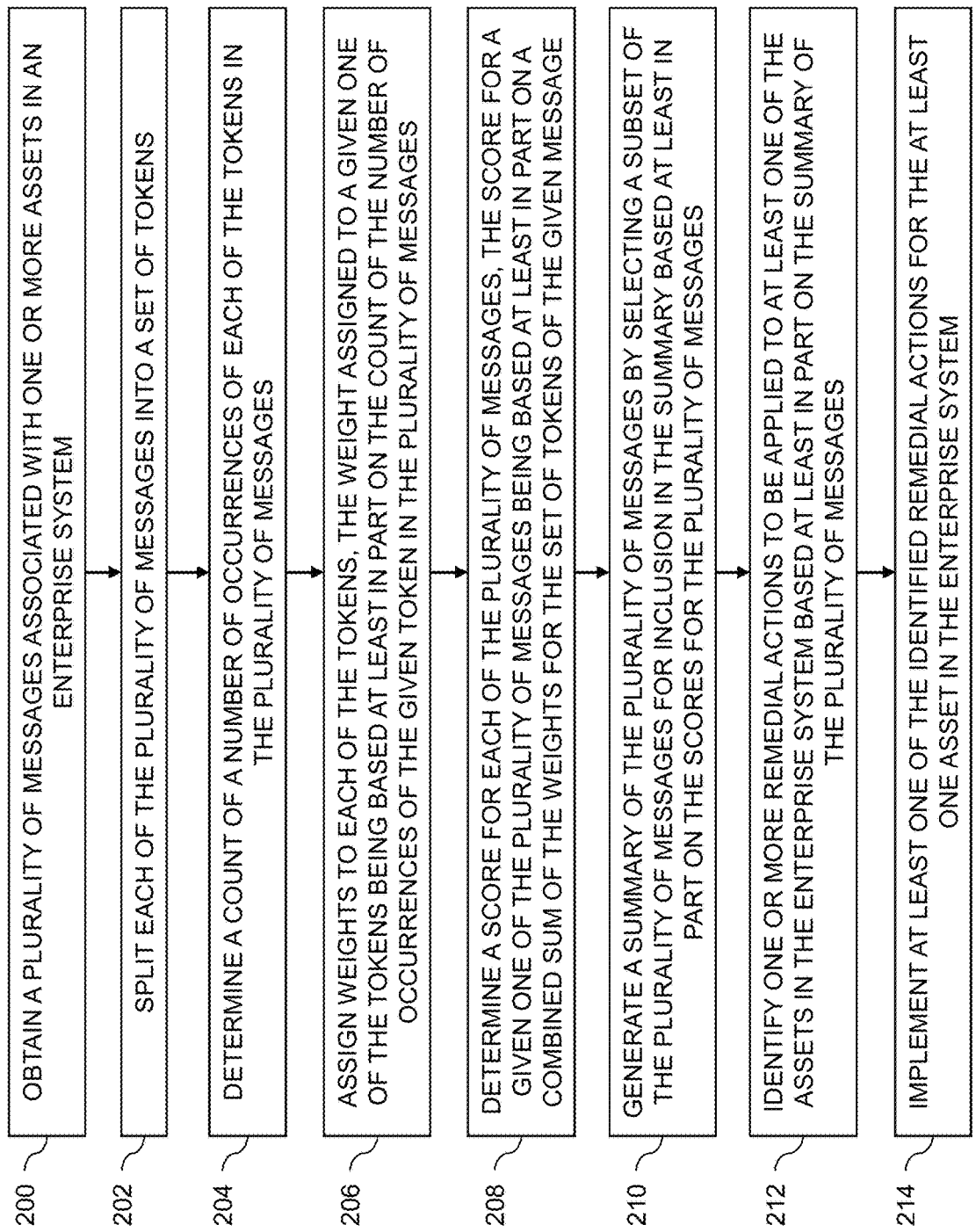
FIG. 2 is a flow diagram of an exemplary process for generating summaries of messages associated with assets in an enterprise system in an illustrative embodiment.

The FIG. 2 process continues with splitting each of the plurality of messages into a set of tokens in step 202, and determining a count of a number of occurrences of each of the tokens in the plurality of messages in step 204. Step 202 may include splitting messages into respective sequences of strings using natural language processing (NLP) delimiters, where each string sequence corresponds to a token. Step 202 in some embodiments includes recognizing one or more designated special string sequences, such as names of entities in the enterprise system, Internet Protocol (IP) addresses, uniform resource identifiers (URIs), dates and times, etc. Step 204 may include, for a given designated special string sequence, determining a count of the number of occurrences of all string sequences recognized as the given designated special string sequence (e.g., counting the number of occurrences of all IP addresses). Step 204 may further include defining semantic equivalence between two or more distinct string sequences. Determining the count of the number of occurrences of each of the tokens may comprise maintaining a single count of the number of occurrences of each of the two or more distinct string sequences with defined semantic equivalence (e.g., for two string sequences "Entity One" and "Entity 1", a single count may be maintained). Step 202 may include removing from the set of tokens any token having a length less than a first designated threshold or a length greater than a second designated threshold.

In step 206, weights are assigned to each of the tokens. The weight assigned to a given one of the tokens may be based at least in part on the count of the number of occurrences of the given token in the plurality of messages (e.g., the weight for the given token may be proportional to its count). Step 206, in some embodiments, uses log weight or entropy weight. Step 206 may also include utilizing one or more user-defined weights to increase or decrease the weight assigned to one or more designated tokens (e.g., tokens of special interest to a user). In step 208, a score is determined for each of the plurality of messages. The score for a given one of the plurality of messages is based at least in part on a combined sum of the weights for the set of tokens of the given message.

A summary of the plurality of messages is generated in step 210 by selecting a subset of the plurality of messages for inclusion in the summary based at least in part on the scores for the plurality of messages. Step 210 may include specifying a budget comprising a designated number of messages to include in the summary. Selecting the subset of the plurality of messages for inclusion in the summary in step 210 may comprise selecting, from a collection comprising at least a subset of the plurality of messages, a message with a highest score, removing the selected message from the collection, and repeating the selecting and removing until the specified budget is reached. In this manner, the generated summary selects the most frequent patterns in the collection. Selecting the subset of the plurality of messages for inclusion in the summary in step 210 may alternatively comprise selecting, from a collection comprising at least a subset of the plurality of messages, a message with a highest score for tokens not yet present in messages selected for the summary, removing the selected message from the collection, and repeating the selecting and removing until the specified budget is reached. In this manner, the generated summary selects frequent but non-overlapping patterns in the collection.

The FIG. 2 process continues with identifying one or more remedial actions to be applied to at least one of the assets in the enterprise system based at least in part on the summary of the plurality of messages in step 212, and implementing at least one of the identified remedial actions for the at least one asset in the enterprise system in step 214.

In various enterprise systems, it is desired to gather and concentrate log messages generated by hardware and software appliances that are part of or are associated with an enterprise system for storage and processing. The rate of arrival of log messages to a concentrator device, in some cases, may exceed 1,000 log messages per second. For some enterprise systems, the rate of arrival of log messages may reach 30,000 log messages per second or greater. As a result, some enterprise systems may have to store and process a collection of log messages whose growth rate is millions of entries per hour. For an analyst or system administrator of such an enterprise system, manual inspection of such a large collection of log messages is not feasible.

To address these and other issues, illustrative embodiments provide techniques for semantic summarization of collections of log messages, where the log messages may be gathered from a variety of devices and applications in or associated with an enterprise system. In some embodiments, summarizations of collections of log messages are generated which include carefully selected ones of the log messages in a collection that cover the greatest possible subset of log messages. Such embodiments may do so while minimizing redundancy of the log messages if desired. The log messages in a generated summary may be interpreted as a representation of the most frequent patterns in the collection of log messages, or the most frequent but least redundant set of patterns in the collection of log messages. Utilizing the generated summary or summaries of a collection of log messages, embodiments are able to more efficiently allocate resources (e.g., computing and network resources, analyst time, etc.) to remediate potential security threats or other issues affecting the enterprise system.

Given that a collection of log messages may grow at the rate of tens of millions of messages per hour, analysis or system administrators of an enterprise system may resort to issuing a series of automatic or manual queries against the data in the collection to check if certain events have occurred. Such a query-and-answer approach is one-dimensional. Some embodiments apply text summarization techniques to a collection of log messages. In some embodiments, the goal is to generate a summary of the collection that answers the question or request of providing a succinct description of what happened in the collection of log messages, so as to determine how an enterprise system may be affected (e.g., to detect and remediate security threats to the enterprise system, to address mis-configuration or other types of errors or issues in the enterprise system, etc.).

In some embodiments, a summary of a collection of log messages is generated by collecting a relatively small set of log messages (e.g., on the order of 20 to 50 log messages, or some other user or system-specified threshold number of log messages) that cover and overlap with a largest possible subset of log messages in the original collection. The summary may also compute a score representing a fraction of log messages from the entire collection that are "covered" or "partially covered" by the summary as will be described in further detail below. Similarly, the summary may compute a score representing a fraction of log messages from the entire collection that are "uncovered" by the summary.

The set of log messages that belong to the summary may be interpreted as representative of frequently appearing patterns in the collection. In some embodiments, for each log message in the summary, the number of other log messages in the collection that are similar to that log message is computed. Similarity in this context is not syntax-based but is instead semantic similarity. In some embodiments, the number of "tokens" in common between a pair of log messages is used as a semantic similarity measure.

Various types of systems may consume a large volume of log messages. As an example, RSA NetWitness® available from Dell EMC may consume a large volume of messages for various customers (e.g., where each customer may be associated with one or more enterprise systems). An investigation module of RSA NetWitness® may provide a method for summarizing log messages based on metadata extracted from the log messages, but does not provide a way to quickly summarize a dataset (e.g., a collection of log messages) and maintain the entire collection. RSA NetWitness® may be suitably modified to provide the functionality described herein to provide a scrolling, real-time log viewer accessible to analysts or other system administrators. Since the actual number of log messages may be too large for the analyst to read as its scrolls, summaries generated as described herein may allow the analyst to read scrolling logs without losing important detail.

Summarization of collections of log messages may also be used for result set summarization. Results from log message queries are often voluminous and are thus difficult for an analyst or other requesting user to quickly process. Summarization of results from a log message query generated using the techniques described herein can help an analyst comprehend the results of log message queries in a timely fashion.

In some use cases, an analyst may spend time for each incident identifying particular hosts and user or client devices based on IP addresses and various message types. A contextual summary generated using the techniques described herein can help analysts quickly identify the user who likely logged into a certain machine without having to comb through all the events looking at their individual time stamps. Such host IP identification can save an analyst time on each incident, thus allowing the analyst to reduce a time required to remediate incidents, allowing the analyst to process more incidents in the same amount of time. Closing or remediating more incidents can reduce the risk to the enterprise system, providing increased security, uptime, reliability, etc.

The summarization techniques described herein may also be used for application and device monitoring in an enterprise system. For example, suppose it is known that a set of hardware appliances are part of critical enterprise infrastructure of an enterprise system. Similarly, it is possible that a set of applications is of high importance to an enterprise system. Such hardware appliances and applications may be referred to as high-criticality assets. Continuous generation of summaries of log messages relating to such high-criticality assets can provide an analyst with a succinct description of the events generated and incidents associated with the high-criticality assets.

Summarization techniques may also be used to compute and keep summaries before sharding. It may be infeasible to keep in memory a complete collection of log messages generated by a large number of hardware and software appliances. It is feasible, however, to keep a large number of summaries that represent snapshots of the data in the collection of log messages over time for reference and additional processing.

The comparison of summaries generated using the techniques described herein may be useful for monitoring and other tasks. Suppose, for example, that a critical asset is being monitored using a Supervisory Control and Data Acquisition (SCADA) system. Further suppose that a summary of log messages for the critical asset have been computed at consecutive time intervals. Differences between such summaries may be used as an indication of changes of the state of the critical asset, or more generally of an enterprise system. In some embodiments, a distance metric may be applied to a series of summaries to identify large-scale changes. This can also be extended to consider change "velocity" (e.g., the change in log message patterns with respect to time) and change "acceleration" (e.g., the change in velocity with respect to time). Alerts may be generated and remedial actions may be triggered on detecting extensive changes. Various thresholds may be used to determine whether changes are extensive or should otherwise trigger generation of an alert or taking of remedial actions. For example, different thresholds may be used for monitoring distance, change velocity and change acceleration for a set of summaries.

Summarization techniques described herein may be further utilized for identifying "rare" log messages. Suppose, for example, that a summary of a large collection of log messages has been computed. The rare log messages are those that cover infrequent or rare tokens (e.g., tokens that occur with a frequency below some designated threshold). Rare log messages may be identified, and various statistics may be computed as desired.

Various techniques may be used for extractive single and multi-document summarization of text documents. Techniques for the summarization of log messages, also referred to herein as logs or messages, in SIEM and other types of security systems (e.g., SOC, threat detection and remediation systems, etc.) are needed.

In some embodiments, summarization of log messages may be viewed as occurring in three phases or stages. In a first phase or stage, log messages are tokenized. In a second phase or stage, each token is assigned a weight value. In a third phase or stage, log messages for a summary are extracted. The extraction of log messages for the summary may proceed in multiple iterations. During each iteration, every log message (possibly up to some designated maximum number of log messages based on available computing resources) is scored, and the log message with the highest score is selected and added to the summary. This process continues until the summary achieves the desired length or size.

Message tokenization may involve splitting of the log messages onto a sequence of strings. In some embodiments, NLP delimiters may be used to provide such splitting and tokenization. NLP delimiters may include spaces, tabs, returns, punctuation, etc. For each token in the collection, a count of the number of times that token appears in the collection is maintained. In some embodiments, each token is assigned a weight that is proportional to its token count. Various types of weighting may be used, including log weighting, entropy weighting, etc.

In some embodiments, after tokenization, various processing is performed prior to determining token counts. For example, certain types of information or fields may be recognized, such as names of entities, IP addresses, URIs, dates and times, IP and other protocol-specific terms, etc. After such recognition, token counts may be determined. For example, a token count may be determined to count the number of times that all IP addresses appear, or the number of times one or more specific IP addresses occur in the collection. Similarly, token counts for the number of times that all or specific entity names, URIs, dates and times, IP and other protocol-specific terms, etc. may be determined. Performing such recognition of designated types of information is useful for generating more accurate summaries. Consider, for example, an entity in an enterprise system that goes by the name "Entity One." This name, however, may be shortened or altered in numerous ways, such as "Entity 1," "Entity1," "Ent. 1," etc. By performing entity name recognition after tokenization but prior to determining token counts, these variations may be considered and a more accurate weight may be assigned to the token for Entity One. Further, some embodiments may treat "pure" numbers (e.g., all-digit tokens in base-10 or base-16) in a special manner, such as by ignoring pure numbers for the purposes of tokenization.

During the iterative selection and extraction phase, each log message is assigned a score that is indicative of how well that log message represents the collection of log messages. The log message with the highest score (or some designated number of log messages with the highest scores, such as the top five) is added to the summary. Various techniques may be used to score the log messages. In some embodiments, a log message is selected whose average combined weight of tokens not yet covered by the summary is maximized. This method of scoring selects frequent but non-overlapping patterns of log messages. For this scoring method, the log messages may be re-ranked following selection of each log message. In other embodiments, a log message is selected whose average combined weight of tokens is maximized. This method of scoring selects the most frequent patterns, which may be overlapping.

Additional details regarding the three stages of the summarization techniques described above will now be provided. Given a collection of log messages, denoted $\mathcal{L}$, the following steps are used to compute a summary, denoted S.

In a first step, the log messages are tokenized. As described above, this may involve recognizing various special terms (e.g., entity names, IP addresses, URIs, etc.).

In a second step, "noise" tokens are removed. Some embodiments assume that "short" tokens (e.g., tokens with a length less than some designated threshold) and "extra-long" tokens (e.g., tokens with a length that exceeds some designated threshold) are the result of errors in the tokenization process and are thus discarded.

In a third step, token counting is performed. A total count of the number of occurrences of every token in the collection is maintained.

In a fourth step, token weight assignment is performed. Each token in the collection is assigned a weight that is proportional to its count. Various types of weighting functions may be used. In some embodiments, log weight is used. If a token t appears n times, then the log weight of the token t is $w(t)=\log(n)$. In other embodiments, entropy weight is used. Suppose that a token t appears n times, and suppose that the sum of the counts of all tokens is N. Then the probability of a token t is $p=n/N$. In some embodiments, the log entropy weight is calculated as $w(t)=1+p\cdot\log(p)$, and in other embodiments the log entropy weight is calculated as $w(t)=1-p\cdot\log(p)$. It should be appreciated that various other weighting functions may be used in other embodiments.

In some embodiments, a set of user-defined weights may be used to artificially increase or lower the weight which would otherwise be assigned to a particular token with the selected weighting function. For example, an analyst or other user may specify a set of terms or parameters of interest or disinterest whose assigned weight is increased or decreased as desired.

In a fifth step, the summary of the collection of log messages is computed. Let the set of tokenized log messages be $\mathcal{L}=\{L_1, L_2, \ldots\}$, let the set of tokens be $T=\{t_1, t_2, \ldots\}$, let s be a function that measures the size of the summary, let B be the "budget" or allowed or desired maximal size of the summary, and let C be the final summary. In some embodiments, the budget B=40 log messages is set as the desired size of the summary.

The following variables are initialized: $C \leftarrow \emptyset$; $S \leftarrow \emptyset$; $T_c \leftarrow \emptyset$. $T_c$ is used to denote the set of tokens covered by the summary in a current iteration. Log messages are then selected while the desired size of the summary is not achieved, i.e., while $s(S)<B$. From the set of remaining log messages, a log message is selected whose combined sum of weights of tokens not yet used is maximized. The selected log message is the most "valuable" to the summary as determined using a message scoring function. As noted above, various message scoring functions may be used.

A first message scoring function selects the log message whose average combined weight of tokens not yet covered by the summary is maximized, thus selecting frequent but non-overlapping patterns of log messages for the summary. The following equation may be used for the first scoring function:

$$l = \underset{L \in \mathcal{L}}{\operatorname{argmax}} \left( \sum_{(t \in L) \wedge (t \in T \setminus T_c)} w(t) \right) \Big/ |L|$$

A second scoring function selects the log message whose average combined weight of tokens is maximized, thus selecting the most frequent patterns which may be overlapping. The following equation may be used for the second scoring function:

$$l = \underset{L \in \mathcal{L}}{\operatorname{argmax}} \left( \sum_{(t \in L)} w(t) \right) \Big/ |L|$$

The highest scoring message is added to the summary $S \leftarrow S \cup l$, and the list of used tokens $T_c$ is updated.

The complexity of the above-described algorithm is $O(|S| \cdot L)$, where $|S|$ is the number of messages in the summary and L is the number of messages in the collection. Since the budget B is a constant, the algorithm is linear time. The approach is asymptotically optimal, since the data must be read at least once. Sublinear time algorithms will not be able to do so.

The above-described algorithm is able to summarize a collection of 1,000 log messages in about half a second, and is able to summarize a collection of 10,000 log messages in about one second. The work required to summarize large collections of log messages (e.g., collections of 25 million log messages or more) is substantial. If a multi-threaded system is available, some embodiments may utilize Map/Reduce parallelism to read the data from disk or other storage, to compute the token counts, and to select and extract the highest scoring log message.

Figure 3:
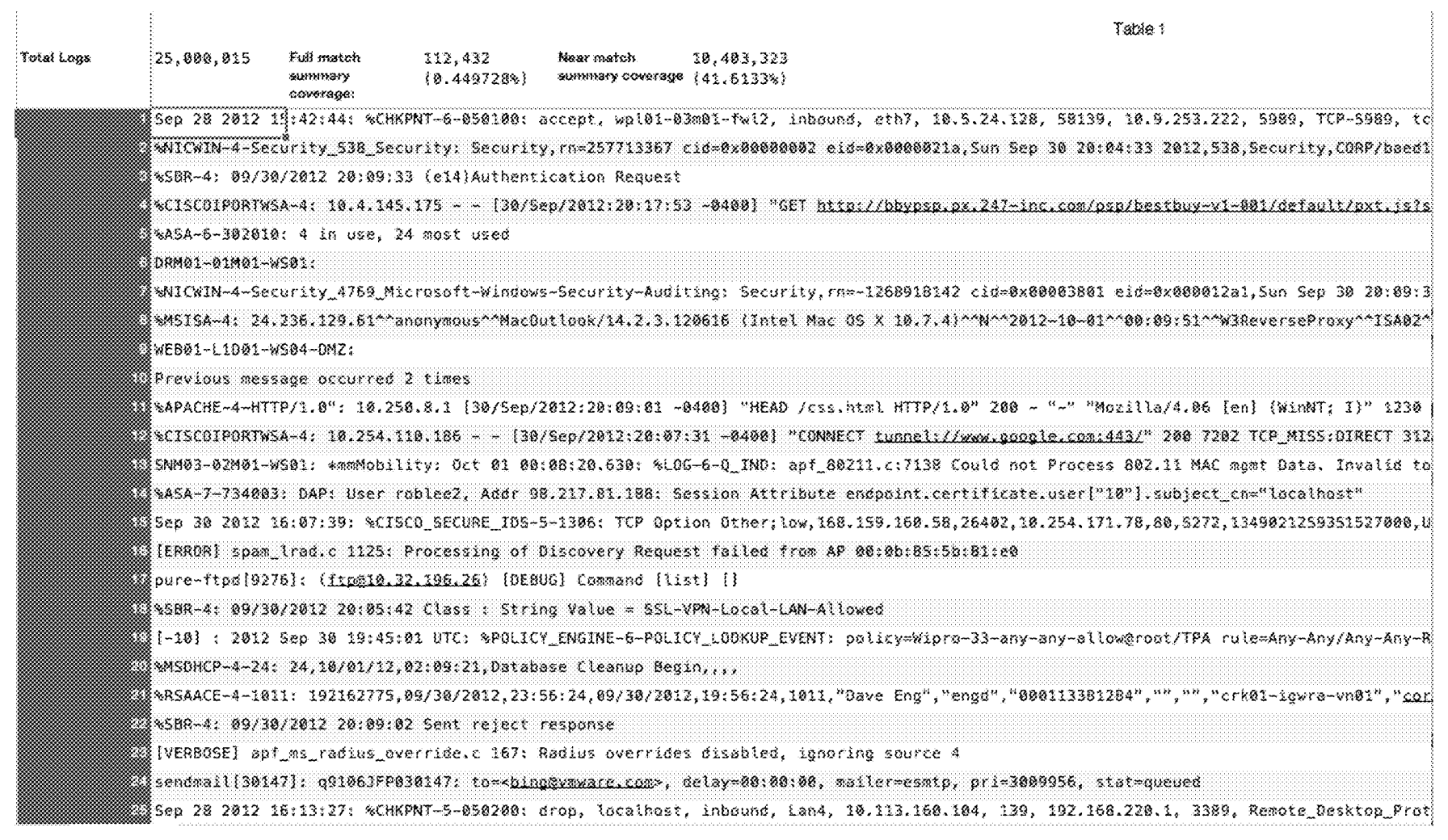

FIGS. 3 and 4 shows respective summaries of a collection of 25 million log messages. The summary in FIG. 3 is produced using the first scoring function described above, while the summary in FIG. 4 is produced using the second scoring function described above. In both summaries, the order in which the log messages appear is based on the ranking of the log messages. Recall that the first scoring function used to generate the FIG. 3 summary produces a set of log messages that maximize coverage but also force minimal overlap. The second scoring function used to generate the FIG. 4 summary produces a list of frequent patterns ordered according to ranking without forcing minimal overlap.

The algorithm described above may be extended in a variety of ways. Suppose, for example, that a collection of network sessions can be represented as "messages" that describe aspects of the network sessions such as the transport protocol used, the endpoints of the connection, application level details, network errors, session duration, NetFlow information, etc. The above-described algorithm may be used to provide summaries of such a collection of network sessions in a manner similar to that described above with respect to a collection of log messages.

As noted above, some embodiments use log or entropy weighting of terms. In some cases, an analyst or user might be interested in the summary of log messages which contain special tokens. In such cases, the weights for such special tokens or terms can be inflated to target a specific type of summary. Similarly, terms not of interest may have their associated weights deflated to ignore log messages that contain certain terms. In some cases, the terms may be ignored completely such as in the case of pure numbers described above. The log messages may then be summarized with the modified weights.

Aspects of the algorithm such as tokenization (e.g., the specific types of delimiters used), noise token removal and sets of special tokens that need to be recognized for a particular use case can be adapted as needed for a particular data set.

In some embodiments, similarity between messages is measured based on a token overlap metric. This may be extended in various ways, such as by measuring a weighted sum of weights of overlapping tokens, which may or may not be normalized. It is also possible to define semantic or equivalence classes of distinct tokens and then measure similarity at a higher level using the equivalence classes which can capture the notion of synonymy in NLP.

The tokenization described above using NLP delimiters is simple and efficient. If necessary, advanced parsing and extraction techniques may be used to recognize special terms as described above, such as named entities, types of numbers (e.g., representing network ports, IP addresses, or other fields used for particular protocols), etc., so as to alter the measure of semantic similarity between log messages.

Another extension used in some embodiments is to probabilistically select log messages, rather than ranking every log message. The summary in such cases will be imperfect, but may provide a reasonable approach if time is critical.

Further, the summarization techniques described herein may be generalized to different types of STEM events. Currently, investigating events is costly, and it is infeasible to look at every possible event that the STEM generates. Some embodiments may apply summarization and clustering of events using additional information such as the time of the event to guide analysts to examine sets of events at once. This can also be useful in the context of orchestration and automation (e.g., Security Orchestration and Automation Response (SOAR)), as current systems may not scale well when there are many events to process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating summaries of messages associated with assets in an enterprise system will now be described in greater detail with reference to FIGS. 5 and 6. Although described in the context of system 100, these platforms may also be used to implement at least portions of other information processing systems in other embodiments.

Figure 5:
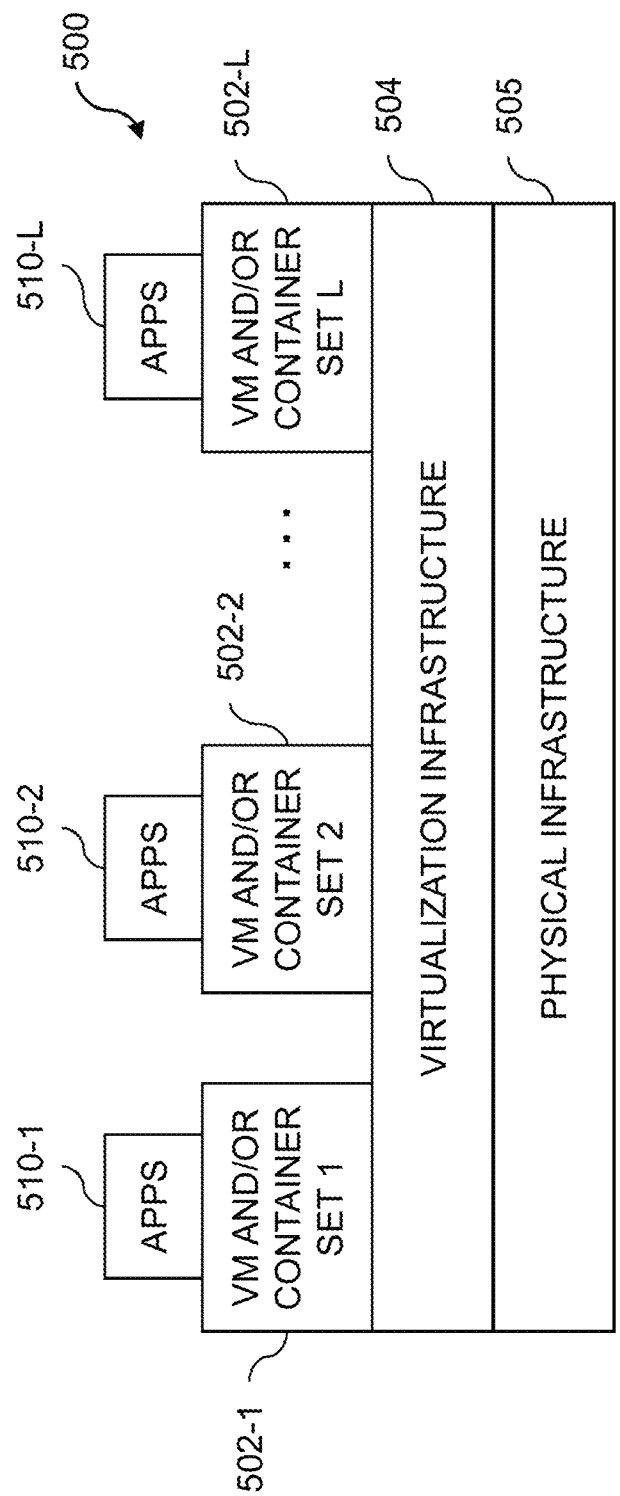
FIGS. 5 and 6 show examples of processing platforms that may be utilized to implement at least a portion of an information processing system in illustrative embodiments.
Figure 6:
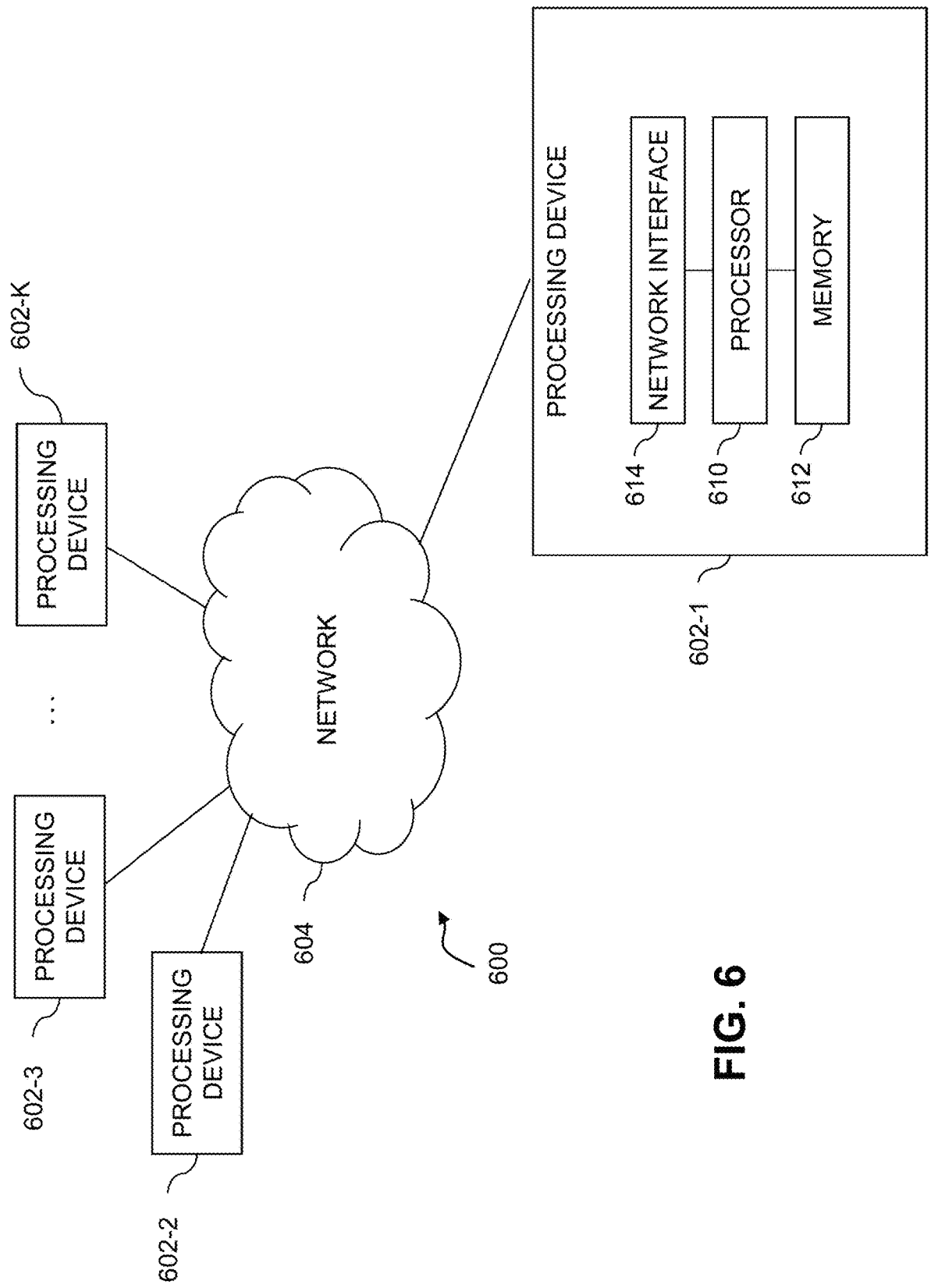

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. An example of a hypervisor platform that may be used to implement a hypervisor within the virtualization infrastructure 504 is the VMware® vSphere® which may have an associated virtual infrastructure management system such as the VMware® vCenter™.

The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating summaries of messages associated with assets in an enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, message types, weighting functions, scoring functions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
obtaining a plurality of messages associated with one or more assets in an enterprise system, a given one of the assets comprising at least one of a physical computing resource and a virtual computing resource in the enterprise system;
splitting each of the plurality of messages into a set of tokens;
determining a count of a number of occurrences of each of the tokens in the plurality of messages;
assigning weights to each of the tokens, the weight assigned to a given one of the tokens being based at least in part on the count of the number of occurrences of the given token in the plurality of messages;
determining a score for each of the plurality of messages, the score for a given one of the plurality of messages being based at least in part on a combined sum of the weights for the set of tokens of the given message;
generating a summary of the plurality of messages by selecting a subset of the plurality of messages for inclusion in the summary based at least in part on the scores for the plurality of messages;

identifying one or more remedial actions to be applied to at least one of the assets in the enterprise system based at least in part on the summary of the plurality of messages; and implementing at least one of the identified remedial actions for the at least one asset in the enterprise system;

wherein the method is performed by at least one processing device comprising a processor coupled to a memory.

2. The method of claim 1 wherein the plurality of messages comprises log messages obtained from the one or more assets in the enterprise system.

3. The method of claim 1 wherein the plurality of messages comprise representations of network sessions between pairs of assets in the enterprise system.

4. The method of claim 1 wherein splitting a given one of the plurality of messages comprises splitting the given message into a sequence of strings using one or more natural language processing delimiters, each string sequence corresponding to one of the set of tokens.

5. The method of claim 4 wherein splitting a given one of the plurality of messages comprises recognizing one or more designated special string sequences.

6. The method of claim 5 wherein the one or more designated special string sequences comprise at least one of:
names of entities in the enterprise system;
Internet Protocol (IP) addresses;
uniform resource identifiers (URIs); and
dates and times.

7. The method of claim 5 wherein determining the count of the number of occurrences of each of the tokens in the plurality of messages comprises, for a given one of the designated special string sequences, determining a count of the number of occurrences of all string sequences recognized as the given designated special string sequence.

8. The method of claim 4 further comprising defining semantic equivalence between two or more distinct string sequences, wherein determining the count of the number of occurrences of each of the tokens comprises maintaining a single count of the number of occurrences of each of the two or more distinct string sequences with defined semantic equivalence.

9. The method of claim 1 further comprising removing one or more of the set of tokens having a length less than a first designated threshold or a length greater than a second designated threshold from the set of tokens for a given one of the plurality of messages.

10. The method of claim 1 wherein assigning weights to each of the tokens utilizes at least one of log weight and entropy weight.

11. The method of claim 1 wherein assigning weights to each of the tokens comprises utilizing one or more user-defined weights to increase or decrease the weight assigned to one or more designated tokens.

12. The method of claim 1 wherein generating the summary of the plurality of messages comprises specifying a budget comprising a designated number of messages to include in the summary.

13. The method of claim 12 wherein selecting the subset of the plurality of messages for inclusion in the summary comprises:
selecting, from a collection comprising at least a subset of the plurality of messages, a message with a highest score;
removing the selected message from the collection; and
repeating the selecting and removing until the specified budget is reached.

14. The method of claim 12 wherein selecting the subset of the plurality of messages for inclusion in the summary comprises:
selecting, from a collection comprising at least a subset of the plurality of messages, a message with a highest score for tokens not yet present in messages selected for the summary;
removing the selected message from the collection; and
repeating the selecting and removing until the specified budget is reached.

15. A computer program product comprising a non-transitory processor-readable storage medium having stored therein program code of one or more software programs, wherein the program code when executed by at least one processing device causes the at least one processing device:
to obtain a plurality of messages associated with one or more assets in an enterprise system, a given one of the assets comprising at least one of a physical computing resource and a virtual computing resource in the enterprise system;
to split each of the plurality of messages into a set of tokens;
to determine a count of a number of occurrences of each of the tokens in the plurality of messages;
to assign weights to each of the tokens, the weight assigned to a given one of the tokens being based at least in part on the count of the number of occurrences of the given token in the plurality of messages;
to determine a score for each of the plurality of messages, the score for a given one of the plurality of messages being based at least in part on a combined sum of the weights for the set of tokens of the given message;
to generate a summary of the plurality of messages by selecting a subset of the plurality of messages for inclusion in the summary based at least in part on the scores for the plurality of messages;
to identify one or more remedial actions to be applied to at least one of the assets in the enterprise system based at least in part on the summary of the plurality of messages; and
to implement at least one of the identified remedial actions for the at least one asset in the enterprise system.

16. The computer program product of claim 15 wherein generating the summary of the plurality of messages comprises specifying a budget comprising a designated number of messages to include in the summary, and wherein selecting the subset of the plurality of messages for inclusion in the summary comprises:
selecting, from a collection comprising at least a subset of the plurality of messages, a message with a highest score;
removing the selected message from the collection; and
repeating the selecting and removing until the specified budget is reached.

17. The computer program product of claim 15 wherein generating the summary of the plurality of messages comprises specifying a budget comprising a designated number of messages to include in the summary, and wherein selecting the subset of the plurality of messages for inclusion in the summary comprises:
selecting, from a collection comprising at least a subset of the plurality of messages, a message with a highest score for tokens not yet present in messages selected for the summary;

removing the selected message from the collection; and
repeating the selecting and removing until the specified budget is reached.

18. An apparatus comprising:

at least one processing device comprising a processor coupled to a memory;

the at least one processing device being configured:

to obtain a plurality of messages associated with one or more assets in an enterprise system, a given one of the assets comprising at least one of a physical computing resource and a virtual computing resource in the enterprise system;

to split each of the plurality of messages into a set of tokens;

to determine a count of a number of occurrences of each of the tokens in the plurality of messages;

to assign weights to each of the tokens, the weight assigned to a given one of the tokens being based at least in part on the count of the number of occurrences of the given token in the plurality of messages;

to determine a score for each of the plurality of messages, the score for a given one of the plurality of messages being based at least in part on a combined sum of the weights for the set of tokens of the given message;

to generate a summary of the plurality of messages by selecting a subset of the plurality of messages for inclusion in the summary based at least in part on the scores for the plurality of messages;

to identify one or more remedial actions to be applied to at least one of the assets in the enterprise system based at least in part on the summary of the plurality of messages; and to implement at least one of the identified remedial actions for the at least one asset in the enterprise system.

19. The apparatus of claim 18 generating the summary of the plurality of messages comprises specifying a budget comprising a designated number of messages to include in the summary, and wherein selecting the subset of the plurality of messages for inclusion in the summary comprises:

selecting, from a collection comprising at least a subset of the plurality of messages, a message with a highest score;

removing the selected message from the collection; and
repeating the selecting and removing until the specified budget is reached.

20. The apparatus of claim 18 wherein generating the summary of the plurality of messages comprises specifying a budget comprising a designated number of messages to include in the summary, and wherein selecting the subset of the plurality of messages for inclusion in the summary comprises:

selecting, from a collection comprising at least a subset of the plurality of messages, a message with a highest score for tokens not yet present in messages selected for the summary;

removing the selected message from the collection; and
repeating the selecting and removing until the specified budget is reached.

* * * * *